(12) United States Patent
DiAntonio et al.

(10) Patent No.: US 10,099,338 B2
(45) Date of Patent: Oct. 16, 2018

(54) GRINDING BOOTH ASSEMBLY AND METHOD FOR GRINDING A WORK PIECE

(71) Applicant: The Boeing Company, Chicago, IL (US)

(72) Inventors: Bernard L. DiAntonio, Chadds Ford, PA (US); Antonio Paesano, Wilmington, DE (US)

(73) Assignee: The Boeing Company, Chicago, IL (US)

( * ) Notice: Subject to any disclaimer, the term of this patent is extended or adjusted under 35 U.S.C. 154(b) by 149 days.

(21) Appl. No.: 15/280,133

(22) Filed: Sep. 29, 2016

(65) Prior Publication Data

US 2018/0085883 A1 Mar. 29, 2018

(51) Int. Cl.
| | |
|---|---|
| *B24B 23/00* | (2006.01) |
| *B24B 23/08* | (2006.01) |
| *B24B 57/00* | (2006.01) |
| *B24B 19/14* | (2006.01) |
| *B24B 23/02* | (2006.01) |
| *B23P 6/00* | (2006.01) |
| *B24B 41/06* | (2012.01) |
| *B24B 55/00* | (2006.01) |
| *B23Q 11/00* | (2006.01) |

(52) U.S. Cl.
CPC ............ *B24B 23/005* (2013.01); *B23P 6/002* (2013.01); *B23Q 11/0042* (2013.01); *B24B 19/14* (2013.01); *B24B 23/028* (2013.01); *B24B 23/08* (2013.01); *B24B 41/06* (2013.01); *B24B 55/00* (2013.01); *B24B 57/00* (2013.01)

(58) Field of Classification Search
CPC ..... B24B 23/005; B24B 23/08; B24B 23/028; B24B 41/06; B24B 55/00; B24B 57/00; B23Q 11/0042; B23P 6/002
USPC ...................... 451/28, 361, 456, 453, 42, 43
See application file for complete search history.

(56) References Cited

U.S. PATENT DOCUMENTS

| | | | | |
|---|---|---|---|---|
| 360,313 | A * | 3/1887 | Lewis et al. ............ | B24B 55/06 451/453 |
| 1,386,539 | A * | 8/1921 | Strock .................... | B24B 55/06 29/DIG. 79 |
| 1,633,688 | A * | 6/1927 | Thaete ................... | B24B 55/06 451/453 |
| 1,660,532 | A * | 2/1928 | Steinbach ............... | B24B 55/06 29/DIG. 104 |
| 1,742,331 | A * | 1/1930 | Voigt ..................... | A61C 13/12 433/116 |
| 1,792,313 | A * | 2/1931 | La Measure ............ | D06G 1/00 15/23 |

(Continued)

*Primary Examiner* — George Nguyen
(74) *Attorney, Agent, or Firm* — Walters & Wasylyna LLC

(57) ABSTRACT

A portable booth assembly for receiving a work piece to facilitate working on a work area of the work piece including a housing and an inner core disposed within an interior area of the housing is provided. The portable booth assembly includes an aperture that is formed in the housing and the inner core. The aperture is configured to receive the work piece. The inner core defining the aperture is configured to be supported by the work piece if the work piece is large, or support the work piece if the work piece is small, and isolate the work area within the portable booth assembly. The portable booth assembly further includes a cut out formed in the housing. The cut out is configured to enable access to the work area for working on the work area.

20 Claims, 7 Drawing Sheets

(56) References Cited

U.S. PATENT DOCUMENTS

| | | | |
|---|---|---|---|
| 1,965,076 A * | 7/1934 | Hane | B24B 55/06 |
| | | | 29/DIG. 104 |
| 2,720,067 A * | 10/1955 | Yehuda | B24B 55/12 |
| | | | 451/453 |
| 5,356,334 A | 10/1994 | Gray | |
| 6,796,890 B1 * | 9/2004 | Goldrick | B23D 59/006 |
| | | | 125/12 |
| 9,399,272 B2 * | 7/2016 | Magen | B23Q 11/0046 |

\* cited by examiner

GRINDING BOOTH ASSEMBLY AND METHOD FOR GRINDING A WORK PIECE

FIELD

This application relates to a booth assembly for mounting a work piece and, more particularly, to a portable booth assembly for mounting a work piece to enable grinding, cutting, polishing, and potting of the work piece.

BACKGROUND

The manufacture and repair of large components, such as a rotor blade for a helicopter, require grinding, sanding, bonding, and potting or boding using various resins, sealants, etc. In particular, fitting a tip covering to the rotor blade requires grinding the tip of the blade, and then bonding and sealing the tip covering to the blade. Once cured, the tip end must be ground again to meet the requirements of a fabrication plan. This includes grinding cured polymers, titanium, and nickel, which produces dust, debris, and potentially harmful fumes and sparks. During these processes, the rotor blade must be covered to prevent damage to nearby people, equipment, and object from flying debris. This protective covering must be adjusted to allow other operators to work on different sections of the blade. Occasionally, the blade must be repositioned or flipped, which requires the protective covering to be completely removed and reapplied after the blade movement. Currently, this work is done in an open area of the shop, since the blade is too large to fit into a standard booth, and a larger booth would not feature adequate power to remove the generated debris and fumes, exposing the shop environment to unsafe conditions.

One solution is to vacuum the dust or other debris during the grinding. For example, the mechanic may grind the blade tip end using one hand to hold the grinder and the other hand to hold the vacuum hose aimed at the tip end. However, in this procedure, the mechanic is seated too close to the grinding operation to be able to directly view the surface being grinded, so that he or she can continuously monitor the status of the operation. Instead the mechanic has to frequently stop and check that this operation meets the fabrication plan's requirements, which in turn adds to the length and cost of the operation. Further, the fumes and finer dust produced by the grinding of the blade escape the vacuum into the air, and a large quantity of heavier dust and debris escapes the vacuum to the floor, and also large amounts land on the mechanic himself, nearby mechanics, walls, ceiling, and floor. A hood-type vacuum design has been used, but was unsuccessful in containing all fumes, debris, and dust, partly due to the fact that the grinder operates at speeds of up to 20,000 rpm.

SUMMARY

In one embodiment, a portable booth assembly for receiving a work piece to facilitate working on a work area of the work piece including a housing and an inner core disposed within an interior area of the housing is provided. The portable booth assembly includes an aperture that is formed in the housing and the inner core. The aperture is configured to receive the work piece. The inner core defining the aperture is configured to support the work piece, or support the booth assembly itself, and isolate the work area within the portable booth assembly. The portable booth assembly further includes a cut out formed in the housing. The cut out is configured to enable access to the work area for working on the work area.

In one embodiment, an apparatus including a work piece, a portable booth assembly and a vacuum source is provided. The portable booth assembly receives the work piece to facilitate working on the work piece. The portable booth assembly includes a housing and an inner core. The housing defines an interior area. The inner core is disposed within the interior area. The portable booth assembly includes an aperture formed in the housing and the inner core. The work piece extends through the aperture. The inner core defining the aperture supports the work piece, or supports the booth assembly itself, and isolates the work area within said portable booth assembly. The vacuum source is in fluid communication with the housing and the inner core such that a vacuum is created at the work area by operation of the vacuum source to vacuum dirt and fumes generated from working on said work area.

In another embodiment, a method for working on a work area of a work piece that includes (1) securing a portable booth assembly on the work piece such that the portable booth assembly is supported on the work area and isolates the work area of the work piece within the portable booth assembly within said portable booth assembly; (2) working on the work area of the work piece; and (3) vacuuming the work area while working on the work area is provided.

Other embodiments will become apparent from the following detailed description, the accompanying drawings and the appended claims.

DETAILED DESCRIPTION

Figure 1:
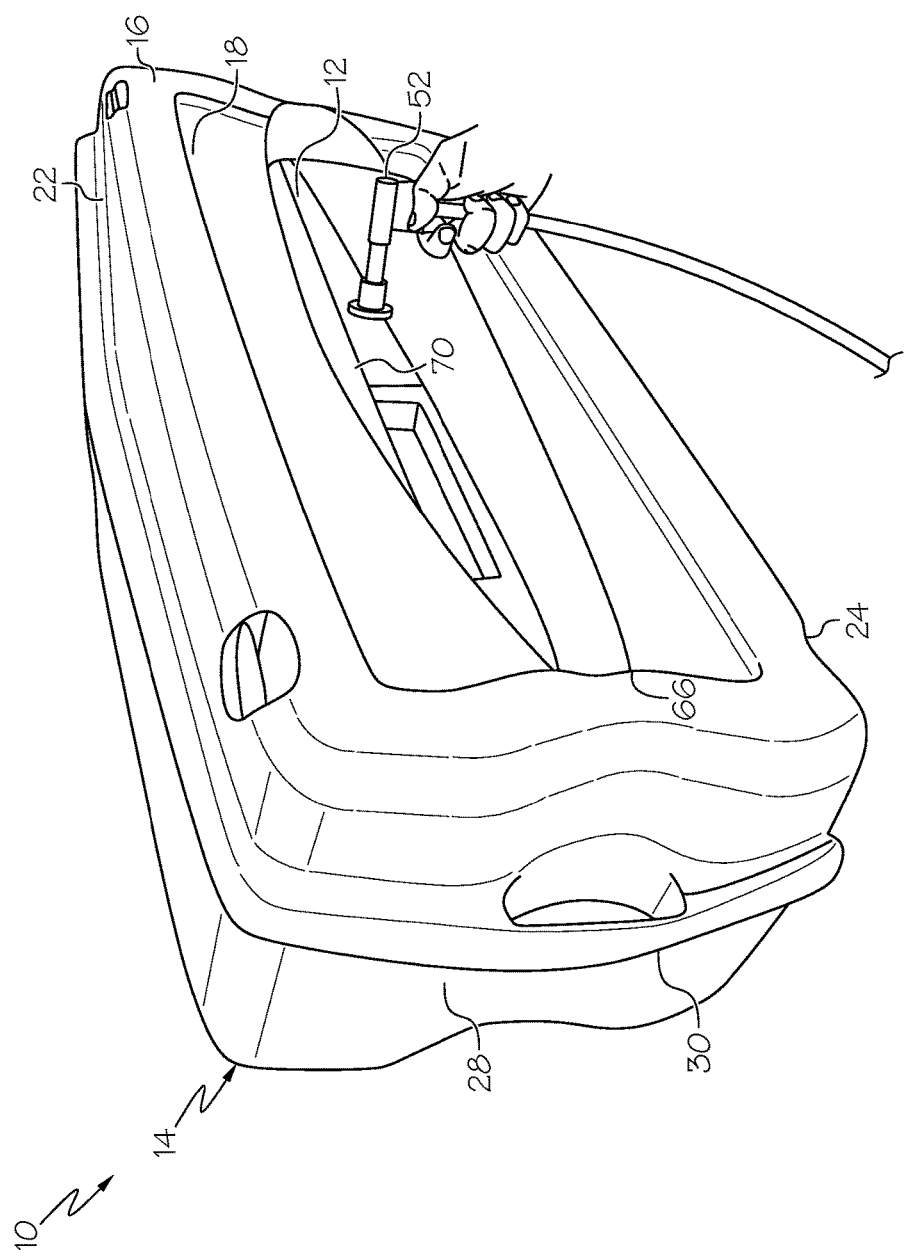
FIG. 1 is a front and left side perspective view of an apparatus that includes a portable booth assembly secured to a rotor blade according to one embodiment.
Figure 2:
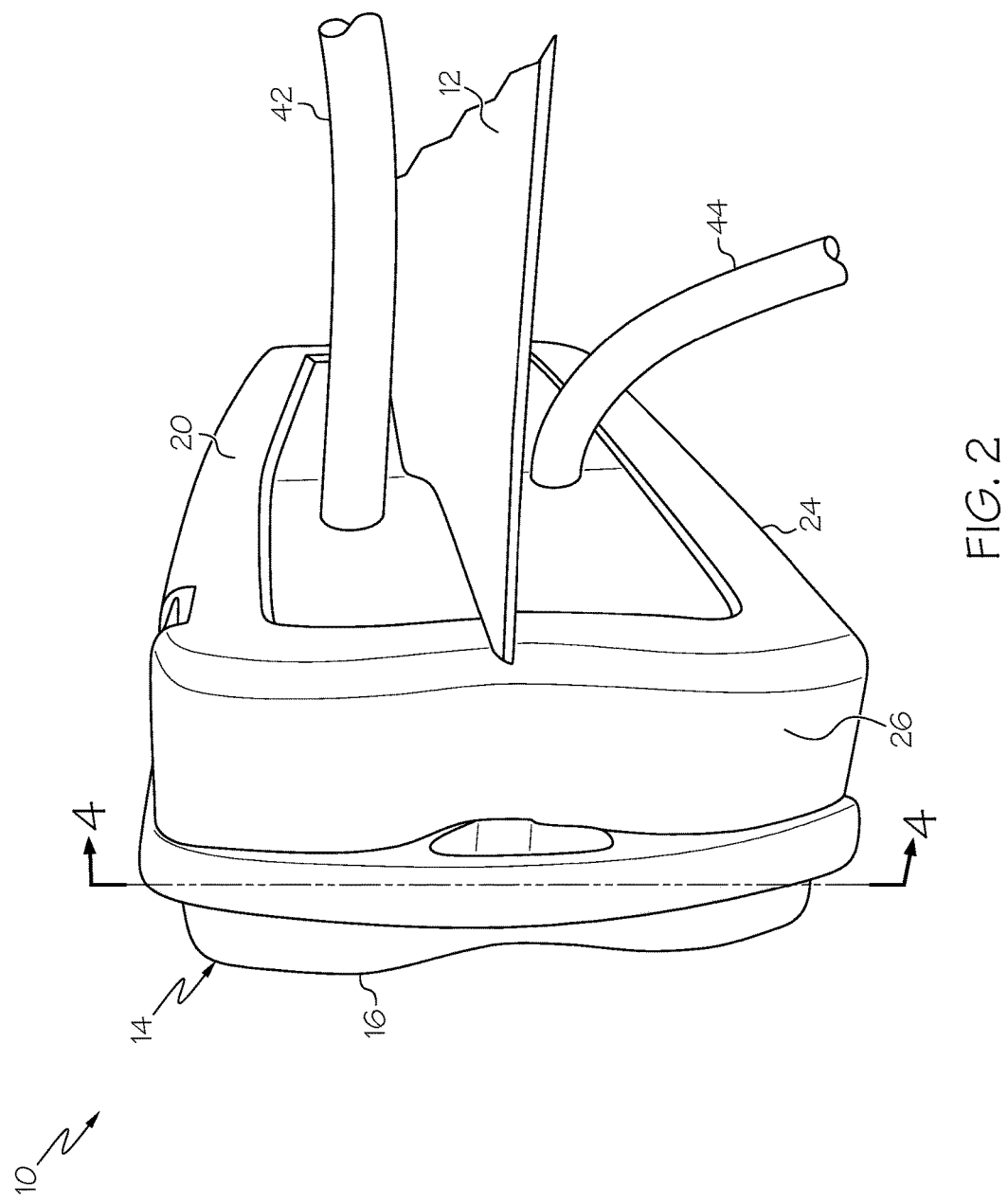
FIG. 2 is a rear and right side perspective view of the apparatus of FIG. 1.
Figure 3:
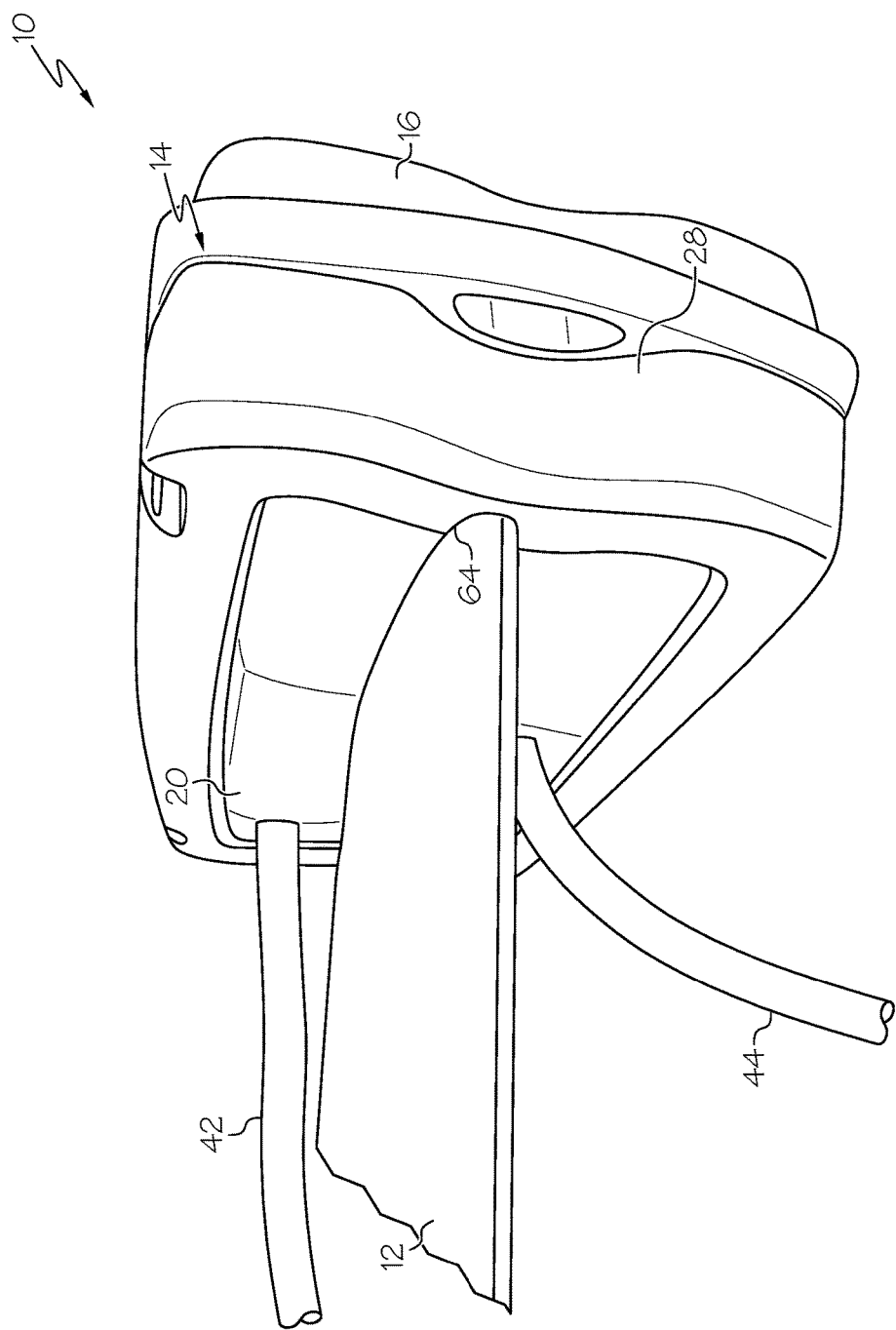
FIG. 3 is a rear and left side perspective view of the apparatus of FIG. 1.

FIGS. 1-3 illustrate an apparatus 10 that comprises a work piece 12 and a portable booth assembly 14 that supports the work piece 12 to enable grinding of the work piece 12. In this embodiment, the work piece 12 is a rotor blade for a helicopter. However, those skilled in the art will appreciate that various types of work pieces may be utilized, whether for aerospace applications or non-aerospace applications, without departing from the scope of the present disclosure.

Figure 4:
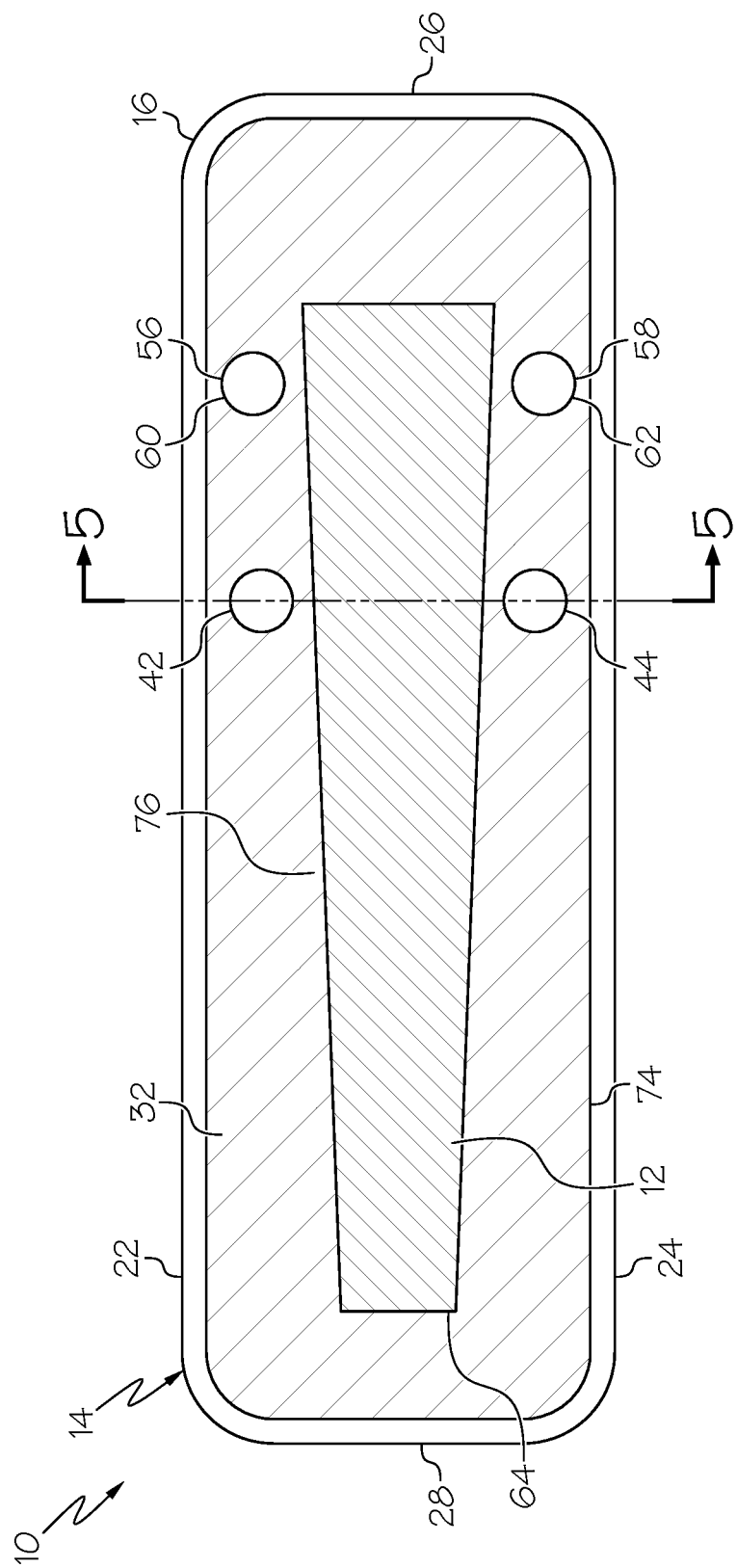
FIG. 4 is a sectional view taken along line 4-4 of FIG. 2 and also including third and fourth hoses extend through passageways in the inner core of the booth assembly.
Figure 5:
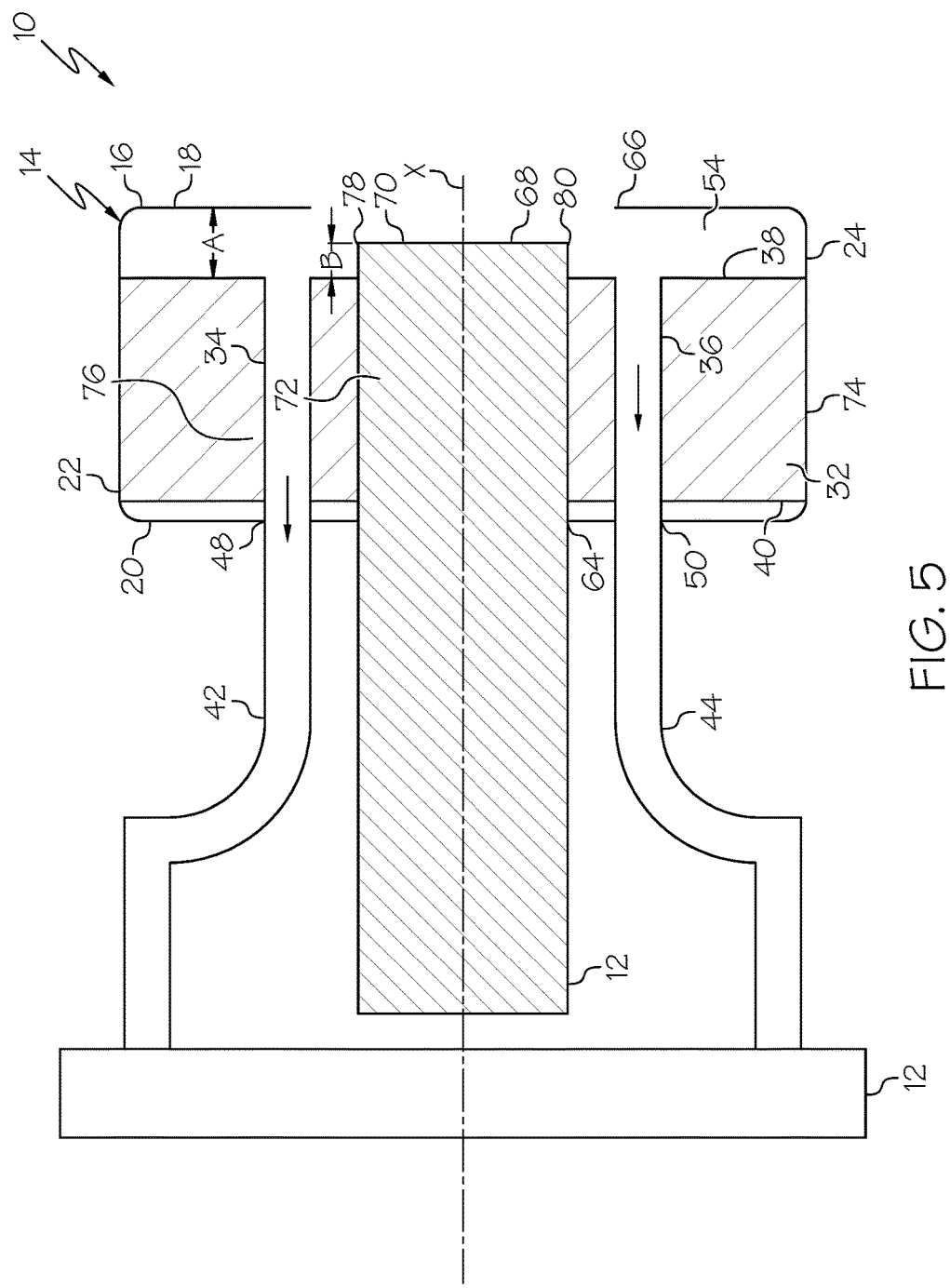
FIG. 5 is a sectional view taken along line 5-5 of FIG. 4.

The portable booth assembly 14 comprises a lightweight housing 16 and a pliable inner core 32 (FIGS. 4 and 5). The housing 16 includes a front wall 18, a rear wall 20 (FIGS. 2 and 3), a top wall 22, a bottom wall 24, and right and left side walls 26, 28 (as viewed in FIG. 1). The housing 16 is formed of a rigid material such as a rigid plastic material or metallic material. However, the use of other materials, such as composite materials, and any combination of any engineering material is also contemplated. The housing 16 may be formed in one piece by injection molding using two mold halves that meet at a parting line 30 of the housing 16. In the embodiment as shown in the figures, the housing 16 is generally rectangular in shape but can alternatively take the form of a variety of other shapes. The housing 16 defines an interior area 54 that receives the inner core 32. All design features, such as opening size and location are customized to specific work area's geometry and operation.

Referring to FIG. 5, the inner core 32 has first and second passageways 34, 36 that extend through the inner core 32 between the front and rear end 38, 40 of the inner core 32. First and second flexible vacuum hoses 42, 44 are each fluidly connected to a vacuum source 46 and extend through respective first and second openings 48, 50 in the rear wall 20 of the housing 16 and through their respective first and second passageways 34, 36. Additional openings, passageways, and flexible hoses may be fluidly connected to the vacuum source 46. Location diameter and cross section shape of above hoses depend on the operation for which booth is used. For example, FIG. 4 shows third and fourth flexible hoses 56, 58 in their corresponding passageways 60, 62 that are horizontally aligned with the first and second hoses 42, 44, respectively. In this exemplary arrangement, the rotor blade 12 is sandwiched between the first and second hoses 42, 44, and between the third and fourth hoses 56, 58. Also, in alternative embodiments, the flexible hoses may extend just to their respective openings in the rear wall or outlets of the passageways instead of extending through them. The diameters of the hoses are generally one and a half inches, but may be at other diameter sizes depending on the design parameters of the portable booth assembly 14.

As seen in FIG. 5, a central aperture 64 is formed in the portable booth assembly 14 and axially extends in the forward and rearward direction through the rear wall 20 and inner core 32. A cut out 66 (FIGS. 1 and 5) is formed in the front wall 18 of the housing 16. The cut out 66 is coaxial with the central aperture 64 and has a larger cross sectional area than the central aperture 64. The cut out 66 is sized to allow access to an operator to grind or otherwise work on a work area 68 of a tip 70 of the rotor blade 12. The central aperture 64 is sized and shaped to conform to the contour of the rotor blade 12 in order to securely receive the rotor blade 12. When the portable booth assembly 14 is slipped around the rotor blade 12, the portable booth assembly 14 slidingly receives the rotor blade 12 such that the tip 70 of the rotor blade 12 extends forwardly beyond the front end 38 of the inner core 32 but still remains within the housing 16. The exposed inner core 32 that defines the central aperture 64 surrounds and engages a portion 72 of the rotor blade 12 adjacent the work area 68 on the tip 70 to support and isolate the work area 68 within the portable booth assembly 14 and from the rest of the rotor blade 12 during the grinding or performance of other operations on the rotor blade 12. If a large work piece is used, the work piece supports the inner core 32. When the vacuum source 46 operates, a vacuum is created at the work area 68 to draw fumes, dust, debris, and sparks generated by the grinding of the tip 70 of the rotor blade 12 through the passageways, inlets, hoses, and porous areas of the inner core 32 and then into a receptacle associated with the vacuum source 46 as indicated by the arrows in FIG. 5.

The inner core 32 may be formed of a variety of pliant and porous materials to support the rotor blade 12 and also to aid in vacuuming the dirt, dust, and debris. The pliant material may be a porous filler material. For example, the inner core 32 may be formed of a prophylactic material. The prophylactic material may comprise a paper filter layer, a fiberglass skin layer or a removable foam layer, or any combination of these layers. The inner core 32 may be formed of a cellular material or an open-cell material. The inner core 32 may also be formed of a layer of foam or multiple layers of foam. The foam may have a honeycomb structure.

In this exemplary embodiment, the inner core 32 is formed of a rigid foam made of Styrofoam having a density of 5 pounds per cubic foot (pcf). The inner core may be formed by other types of rigid foam such as phenolic having a density in the range of 7 to 18 pcf, polyurethane having a density in the range of 2 to 20 pcf, and closed cell polyvinyl chloride having a density in the range of 3.5 to 6 pcf. The foam is rigid enough to support the booth assembly 14 but also pliant so that the foam deforms to allow the rotor blade 12 to slide through the central aperture 64 and then flex back to engage the rotor blade 12. The density of the inner core 32 may be different at portions of the inner core 32. For example, the density may be higher (e.g. twice the density) at the outer periphery 74 (FIGS. 4 and 5) of the inner core 32 to support the housing 16, and lower at the inner portion 76 (FIGS. 4 and 5) of the inner core 32 in order to facilitate the vacuuming of dust and debris. Also, the inner core 32 may have built in channels that extend therethrough and are in fluid communication with the vacuum source 46 to create more suction area. This channel feature also provides suction through the inner core 32 so that the vacuum hoses do not need to reach the inner core 32. As seen in FIG. 5, the inner core 32 is disposed in the housing 16 such that the front wall 18 of the housing 16 is spaced forwardly from the inner core 32 a distance of about three inches. The three-inch spacing or gap A between the front wall 18 of the housing 16 and the inner core 32 is chosen as a compromise between leaving enough clearance for the operator to grind the work area 68 of the blade tip 70 but not too large a gap to weaken the suction power generated by the vacuum source. When the portable booth assembly 14 is slipped on the rotor blade 12, the tip 70 of the rotor blade 12 extends about a quarter of an inch from the front end 38 of the inner core 32 over the gap A. This distance B is based on how much material has to be removed from the rotor blade 12. However, values of A and B may change depending on work piece's size and design, specific operation, and types of debris and fumes.

The portable booth assembly 14 is effective in vacuuming the powder, particles, fumes, and other debris with the grinding tool running at 20,000 rpm or any other very high speed. The portable booth assembly 14 is self-supporting so it may remain attached to the rotor blade 12 until the work is completed, despite repositioning or other movement of the rotor blade 12. This feature enables the rotor blade 12 to be flipped one hundred and eighty degrees or otherwise moved as needed (without removing and reapplying the portable booth assembly 14) to allow several operators to work on the same rotor blade 12 simultaneously. The portable booth assembly 14 may be provided on a wheeled cart for ease of transportation to and from the rotor blade or other work piece. The portable booth assembly 14 may be used in a war zone or other uncontrolled and/or harsh environment (desert, swamp, etc.) where the rotor blade or other work pieces are being repaired and overhauled in order to keep the dirt away from the working area, which is critical to enable bonding, grinding, and potting of the parts of the rotor blade or work piece. The portable booth assembly 14 may be installed on a mechanical part that has an elongated shape that requires work to be performed on its tip that results in the generation of dust, debris, fumes, and sparks.

Figure 6:
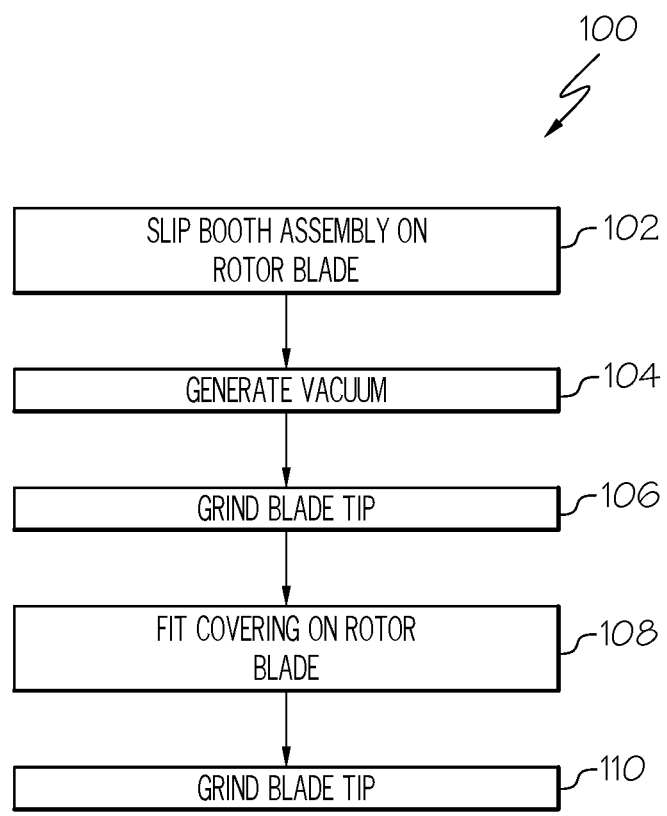
FIG. 6 is flow diagram of the method for installing a covering on a tip of the rotor blade using the portable booth assembly according to the embodiment of FIG. 1.

FIG. 6 shows a method 100 of installing a covering on the tip 70 of a rotor blade 12 using the portable booth assembly 14. First, in step 102, the central aperture 64 of the portable booth assembly 14 is aligned with the tip 70 and the portable booth assembly 14 is slipped around the rotor blade 12 such that the rotor blade 12 slidably extends through the aperture 64 until the tip 70 of the rotor blade 12 extends a quarter of an inch beyond the front end 38 of the inner core 32 and the work area 68 of the blade tip 70 is isolated within the portable booth assembly 14 and from the rest of the rotor blade 12. Then in step 104, the vacuum source 46 is turn on to generate a vacuum in the portable booth assembly 14 and around the work area 68 of the blade tip 70. Then, in step 106, the work area 68 of the blade tip 70 is grinded by an operator using a grinding tool 52 (FIG. 1). This step may include grinding the top side 78 of the blade tip 70 and then flipping the rotor blade 12 and portable booth assembly 14 one hundred and eighty degrees about the longitudinal axis X of the rotor blade 12 and grinding the bottom side 80 of the tip 70. In step 108, a covering is fitted to the rotor blade 12. This step includes mixing and potting epoxy resin systems and sealants. After the resin and sealant has cured, the tip end 70 is ground again along with the resin and sealant to produce a final fit in step 110. The final fit also includes grinding the titanium leading edge cap of the rotor blade 12 and the nickel leading edge erosion cap of the rotor blade 12. Fumes, dust, debris and sparks generated from steps 106 to 110 are drawn through the hoses and collected into a receptacle in the vacuum source 46.

Figure 7:
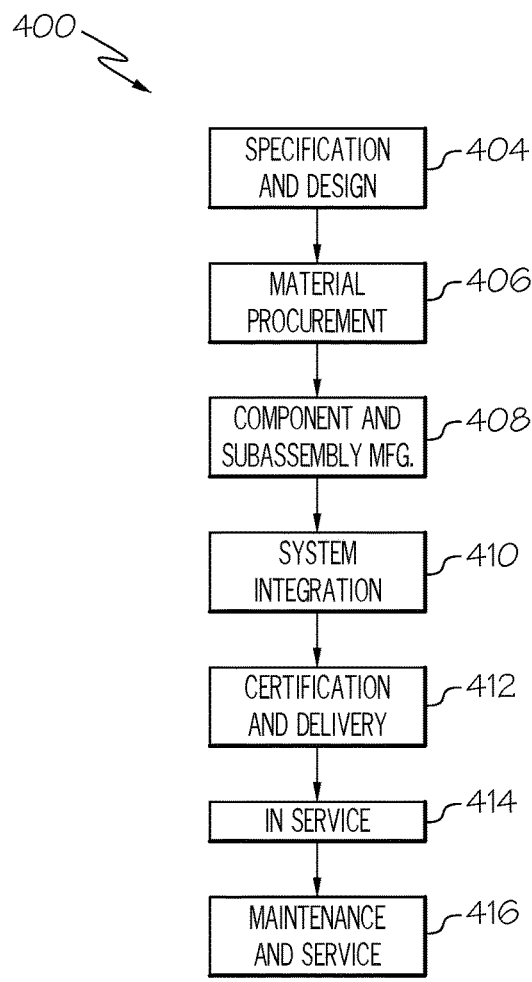
FIG. 7 is flow diagram of an aircraft manufacturing and service methodology.
Figure 8:
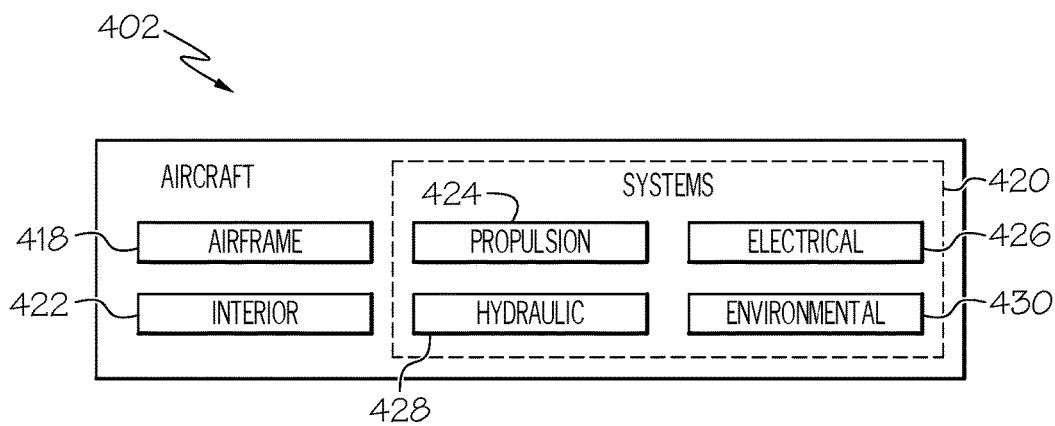
FIG. 8 is a block diagram of an aircraft.

Examples of the disclosure may be described in the context of an aircraft manufacturing and service method 400, as shown in FIG. 7, and an aircraft 402, as shown in FIG. 8. During pre-production, the aircraft manufacturing and service method 400 may include specification and design 404 of the aircraft 402 and material procurement 406. During production, component/subassembly manufacturing 408 and system integration 410 of the aircraft 402 takes place. Thereafter, the aircraft 402 may go through certification and delivery 412 in order to be placed in service 414. While in service by a customer, the aircraft 402 is scheduled for routine maintenance and service 416, which may also include modification, reconfiguration, refurbishment and the like.

Each of the processes of method 400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, single individual, and so on.

As shown in FIG. 8, the aircraft 402, such as a helicopter, produced by example method 400 may include an airframe 418 with a plurality of systems 420 and an interior 422. Examples of the plurality of systems 420 may include one or more of a propulsion system 424, an electrical system 426, a hydraulic system 428, and an environmental system 430. Any number of other systems may be included such as weapons and electronics.

The disclosed portable booth assembly may be employed during any one or more of the stages of the aircraft manufacturing and service method 400. As one example, the disclosed portable booth assembly may be employed during material procurement 406. As another example, components or subassemblies corresponding to component/subassembly manufacturing 408, system integration 410, and or maintenance and service 416 may be fabricated or manufactured using the portable booth assembly. As another example, the airframe 418 and/or the interior 422 may be constructed using the disclosed portable booth assembly. Also, one or more apparatus examples, method examples, or a combination thereof may be utilized during component/subassembly manufacturing 408 and/or system integration 410, for example, by substantially expediting assembly of or reducing the cost of an aircraft 402, such as the airframe 418 and/or the interior 422. Similarly, one or more of system examples, method examples, or a combination thereof may be utilized while the aircraft 402 is in service, for example and without limitation, to maintenance and service 416.

The disclosed portable booth assembly and associated structural assembly are described in the context of an aircraft; however, one of ordinary skill in the art will readily recognize that the disclosed portable booth assembly and associated structural assembly may be utilized for a variety of vehicles, as well as for non-vehicle applications. For example, implementations of the embodiments described herein may be implemented in any type of vehicle including, e.g., passenger and military ships, spacecraft, automobiles and the like.

Although various embodiments of the disclosed portable booth assembly and associated structural assembly have been shown and described, modifications may occur to those skilled in the art upon reading the specification. The present application includes such modifications and is limited only by the scope of the claims.

What is claimed is:

1. A portable booth assembly for receiving a work piece to facilitate working on a work area of the work piece comprising:
   a housing, wherein said housing defines an interior area;
   an inner core disposed within said interior area;
   an aperture formed in said housing and said inner core, wherein said aperture is configured to receive said work piece, wherein said inner core defining said aperture is configured to support said work piece and isolate said work area within said portable booth assembly; and
   a cut out formed in said housing, wherein said cut out is configured to enable access to said work area for working on said work area.

2. The portable booth assembly of claim 1 wherein said housing and said inner core are configured to be in fluid communication with a vacuum source such that a vacuum is created at the work area through operation of said vacuum source to vacuum dirt and fumes generated from working on said work area.

3. The portable booth assembly of claim 2 wherein said inner core has a density that is higher at a periphery of said inner core than the density of the other portions of said inner core.

4. The portable booth assembly of claim 2 wherein said inner core is axially spaced a predetermined gap from said housing to enable the work area of said work piece to extend over at least part of said gap.

5. The portable booth assembly of claim 1 wherein said inner core is configured to conform to a shape of a portion of said work piece adjacent said work area and engage said portion to isolate said work area within said portable booth assembly.

6. The portable booth assembly of claim 1 wherein the inner core is formed of Styrofoam.

7. The portable booth assembly of claim 1 wherein the inner core is formed of a prophylactic material.

8. The portable booth assembly of claim 7, wherein the prophylactic material comprises at least one of a paper filter layer, a fiberglass skin layer, a removable foam layer, or any combination of said paper filter layer, said fiberglass skin layer, or said removable foam layer.

9. An apparatus comprising:
a work piece;
a portable booth assembly, wherein said portable booth assembly receives said work piece to facilitate working on said work piece, wherein said portable booth assembly comprises:
a housing, wherein said housing defines an interior area;
an inner core disposed within said interior area,
an aperture formed in said housing and said inner core, wherein said work piece extends through said aperture, wherein said inner core defining said aperture supports said work piece and isolates said work area within said portable booth assembly; and
a vacuum source, wherein said vacuum source is in fluid communication with said housing and said inner core are such that a vacuum is created at said work area by operation of said vacuum source to vacuum dirt and fumes generated from working on said work area.

10. The apparatus of claim 9 wherein said work piece is a rotor blade.

11. The apparatus of claim 9 wherein said inner core is configured to conform to a shape of a portion of said work piece adjacent said work area and engage said portion to isolate said work area within said portable booth assembly.

12. The apparatus of claim 9 wherein the inner core is formed of foam.

13. The apparatus of claim 12 wherein the foam is one of a Styrofoam, phenolic, polyurethane, and polyvinyl chloride material or any combination of a Styrofoam, phenolic, polyurethane, and polyvinyl chloride material.

14. The apparatus of claim 9 wherein said inner core is axially spaced a predetermined gap from said housing, wherein said work piece extends over at least part of said gap.

15. The apparatus of claim 14 wherein said inner core includes at least one passageway extending through said inner core to said gap, wherein said passageway is in fluid communication with said vacuum source, wherein operation of said vacuum source creates a vacuum in said passageway to draw the dirt and fumes generated from working on said work area through said passageway.

16. A method for working on a work area of a work piece comprising:
sliding the work piece through an aperture formed in a housing defining an interior area and formed in an inner core disposed within the interior area, wherein the inner core defining the aperture engages a portion of the work piece adjacent the work area to support and isolate the work area within said housing;
working on the work area of the work piece; and
vacuuming the work area while working on the work area.

17. A method for working on a tip of a rotor blade comprising:
securing a portable booth assembly on the rotor blade such that the portable booth assembly supports the rotor blade and isolates the tip of the rotor blade within the portable booth assembly;
grinding the tip of the rotor blade; and
vacuuming within the portable booth assembly while grinding the tip.

18. The method of claim 17 wherein the tip has a top side and a bottom side, wherein the method further comprises rotating the portable booth assembly and the rotor blade one hundred and eighty degrees about the longitudinal axis of the rotor blade and grinding the bottom side of the tip of the blade.

19. The method of claim 17 further comprising the step of fitting a covering onto the rotor blade, wherein the step of fitting a covering onto the blade includes either mixing and potting epoxy resin systems and sealants, or applying a sealant, adhesive, or potting material without mixing the sealant, adhesive, or potting material.

20. The method of claim 17 wherein portable booth assembly comprises:
a housing, wherein the housing defines an interior area;
an inner core disposed within the interior area;
an aperture formed in the housing and the inner core; and
wherein the step of securing the portable booth assembly on the rotor blade includes sliding the rotor blade through the aperture such that the inner core defining the aperture engages a portion of the rotor blade adjacent the tip to support and isolate the tip within said portable booth assembly.

* * * * *